United States Patent
Dunn et al.

(10) Patent No.: US 7,430,661 B2
(45) Date of Patent: Sep. 30, 2008

(54) SYSTEM AND METHOD OF STORING USER DATA IN A PARTITION FILE OR USING A PARTITION FILE CONTAINING USER DATA

(75) Inventors: Loren S. Dunn, Spring, TX (US); Rajesh A. Shah, Spring, TX (US); Manish Puri, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/937,145

(22) Filed: Sep. 9, 2004

(65) Prior Publication Data

US 2006/0053270 A1    Mar. 9, 2006

(51) Int. Cl.
*G06F 15/177* (2006.01)
(52) U.S. Cl. .............................. 713/2; 713/1
(58) Field of Classification Search ............ 713/2, 713/1
See application file for complete search history.

(56) References Cited

U.S. PATENT DOCUMENTS

| | | | |
|---|---|---|---|
| 5,768,164 A * | 6/1998 | Hollon, Jr. ................ | 708/174 |
| 5,822,582 A | 10/1998 | Doragh et al. | |
| 5,822,600 A | 10/1998 | Hallowell et al. | |
| 5,920,728 A | 7/1999 | Hallowell et al. | |
| 6,032,255 A * | 2/2000 | Shim et al. .................. | 713/2 |
| 6,115,815 A | 9/2000 | Doragh et al. | |
| 6,178,503 B1 * | 1/2001 | Madden et al. .............. | 713/2 |
| 6,367,074 B1 * | 4/2002 | Bates et al. ................. | 711/170 |
| 6,631,469 B1 * | 10/2003 | Silvester ..................... | 713/2 |
| 6,839,836 B2 * | 1/2005 | Cole et al. .................. | 713/2 |
| 6,882,326 B2 * | 4/2005 | Hirayama et al. ........... | 345/1.1 |
| 6,928,542 B2 * | 8/2005 | Wen et al. ................... | 713/2 |
| 7,234,055 B2 * | 6/2007 | Chiu et al. .................. | 713/2 |
| 7,240,228 B2 * | 7/2007 | Bear et al. .................. | 713/320 |
| 2003/0093658 A1 | 5/2003 | Wen et al. | |
| 2003/0188144 A1 * | 10/2003 | Du et al. ..................... | 713/1 |
| 2003/0204708 A1 | 10/2003 | Hulme et al. | |
| 2004/0030878 A1 | 2/2004 | Hunt et al. | |
| 2005/0015581 A1 * | 1/2005 | Chen .......................... | 713/2 |

FOREIGN PATENT DOCUMENTS

WO    WO03/083694    10/2003

OTHER PUBLICATIONS

Hewlett-Packard Development Company, L.P., "HP Offers Fast, Convenient Information Access for Tablet PCs with QuickLook," Jun. 18, 2003, 2 p. [Online] http://www.hp.com/cgi-bin/hpinfo/oovpf_hpinfo.pl.
Jack Dobiash, "FAT16 Structure Information," Jun. 17, 1999, 5 p. [Online] http://home.teleport.com/ brainy/fat16.htm.
Jupitermedia Corporation, "What is file allocation table?—A Word Definition From the Webopedia Computer Dictionary," Nov. 13, 2003, 2 p. [Online] http://www.webopedia.com/TERM/f/file_allocation_table_FAT.html.

* cited by examiner

*Primary Examiner*—Chun Cao

(57) ABSTRACT

A system comprises non-volatile storage, a read only memory (ROM) that contains an executable BIOS and a CPU communicatively coupled to the non-volatile storage and the ROM. The non-volatile storage contains user data, an executable capture application, a first operating system contained within a non-volatile storage partition, and a partition file that contains a second operating system. The partition file is also included with the non-volatile storage partition. The capture application executes under the first operating system and causes the CPU to store at least some user data in said partition file. The system may also include a user input control and, upon activation of the user input control, the CPU loads the second operating system from the partition file and provides the user access to the user data via a viewer application that runs under the second operating system.

8 Claims, 3 Drawing Sheets

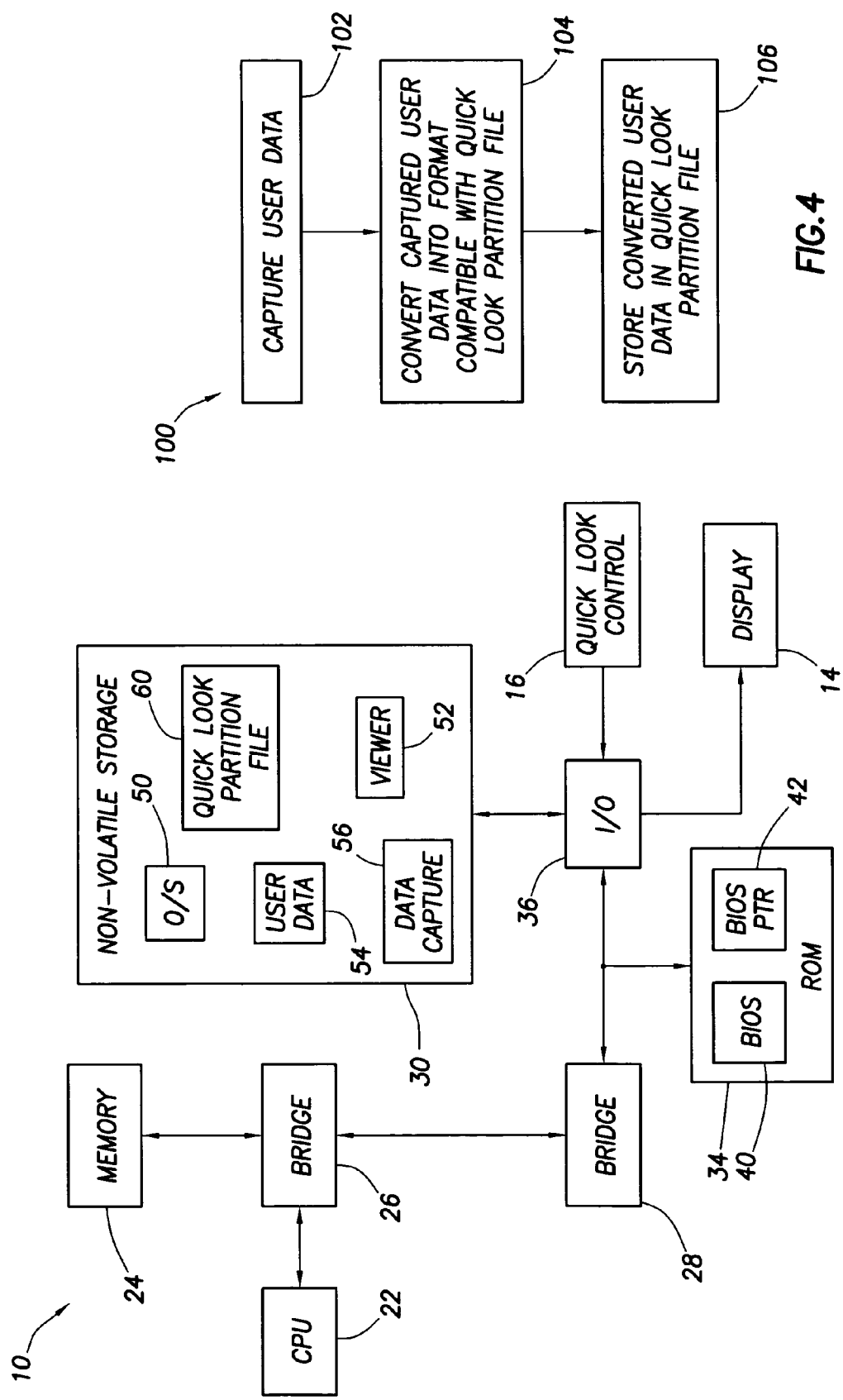

SYSTEM AND METHOD OF STORING USER DATA IN A PARTITION FILE OR USING A PARTITION FILE CONTAINING USER DATA

BACKGROUND

Desktop or notebook computers typically take a substantial amount of time to boot up. The length of time is a function of a variety of factors such as, for example, the time required to spin up the hard drive, the access time of the hard drive, the amount of memory that is tested during the initialization process, and the size of the operating system that is loaded. Although a user may only desire to access a contact, a calendar event, a task, or other user data without needing access to the full capabilities of the computer, the user unfortunately must wait for the time required to boot up the computer system and make all of the system's features available for use.

BRIEF SUMMARY

In accordance with at least some embodiments, a system (and related method) comprises non-volatile storage, a read only memory ("ROM") that contains an executable basic input/output system ("BIOS") and a central processing unit ("CPU") coupled to the non-volatile storage and the ROM. The non-volatile storage contains user data, an executable capture application, a first operating system contained within a non-volatile storage partition, and a partition file that contains a second operating system and that is contained within the non-volatile storage partition. The capture application executes under the first operating system and causes the CPU to store at least some user data in said partition file.

In accordance with yet another embodiment, a system (and related method) comprises non-volatile storage, a CPU coupled to the non-volatile storage, and a user-input control coupled to the CPU. The non-volatile storage contains a first operating system included within a non-volatile storage partition and a partition file that contains a second operating system, user data, and a viewer application. The partition file is also included within the non-volatile storage partition. Upon activation of the user input control, the CPU loads the second operating system from the partition file and provides the user access to the user data via a viewer application that runs under the second operating system.

BRIEF DESCRIPTION OF THE DRAWINGS

For a detailed description of exemplary embodiments of the invention, reference will now be made to the accompanying drawings in which:

FIG. 2 provides a block diagram of an exemplary embodiment of the computer system of FIG. 1;

FIG. 4 shows an exemplary computer method of capturing user data and storing such captured data into the partition file of FIG. 3.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Figure 1:
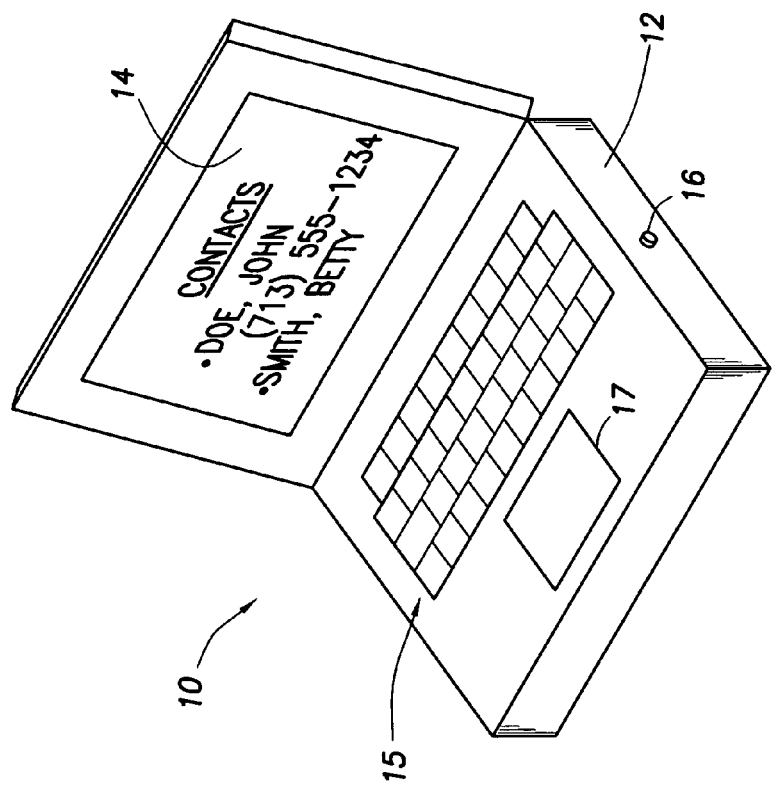
FIG. 1 shows an exemplary portable computer system in accordance with various embodiments of the invention.

Referring now to FIG. 1, a computer system 10 comprises a chassis 12 and a display 14. The embodiment of the computer system 10 depicted in FIG. 1 is a portable computer such as a laptop or notebook computer or handheld computer, although system 10 may comprise other computer system forms (e.g., desktops and servers). The chassis 12 includes a keyboard 15 and a pointing device (e.g., touchpad 17). A user input control 16 is also provided on an exterior surface of the chassis 12. Although the input control 16 is shown on a side surface of computer system 10 in FIG. 1, in other embodiments, the input control can be located in other locations. The input control 16 may be implemented as a push button or other type of user-activated input device. The input control 16 may be referred to herein as a "quick look control" and functions to initiate various actions as described below. In general, when activated while the computer system 10 is in an off state, the quick look control 16 initiates an expedited boot-up process of the computer system 10 to permit a user, for example, to view and manage user-specific data (e.g., contact information, calendar information, and tasks) on the display 14. By "expedited," it is meant that the boot-up process initiated by a user activating the quick look control 16 occurs in less time than it would otherwise take to boot the computer system 10 in accordance with its normal full boot process. The expedited boot process initiated upon activation of the quick look control 16 results in a user generally having limited access and use of the computer system 10. In at least some embodiments, the user is able to access and manage user data comprising contacts, calendar information, and tasks, but, for example, not to run a word processing application or access other information and applications stored on the computer 10.

FIG. 2 shows an exemplary block diagram of an embodiment of computer system 10. As shown, computer system 10 comprises a central processing unit ("CPU") 22, memory 24, a pair of bridge devices 26 and 28, non-volatile storage 30, read only memory ("ROM") 34, an input/output controller 36, display 14, and quick look control 16. Numerous other architectures are possible for computer system 10. In the exemplary architecture of FIG. 2, bridge device 26 couples to the CPU 22, memory 24, and bridge device 28. Bridge device 28 couples to the ROM 34 and 1/0 controller 36. The 1/0 controller 36 couples to the non-volatile storage 30, display 14, and quick control 16.

The memory 24 comprises any suitable type of random access memory ("RAM"). Software instructions stored in non-volatile 30 and ROM 34 may be transferred to memory 24 for execution therefrom by CPU 22. Data may also be stored in memory 24 for use by the CPU 22. The bridge devices 26 and 28 generally provide mechanisms by which the various devices in the computer system 10 can transfer data and messages back and forth. For example, the CPU 22 can fetch instructions from memory 24 and write data to memory 24 via bridge 26. Further, the CPU 22 can cause data and software stored on the non-volatile storage 30 and ROM 34 to be copied to the memory 24 for further access and use by the CPU.

The non-volatile storage 30 comprises any suitable type of non-volatile storage such as a hard disk drive or optical disk drive. A variety of data and applications may be stored on the non-volatile storage 30. Examples of such data and applications include an operating system ("O/S") 50, a viewer application 52, user data 54, a data capture application 56, and a quick look partition file 60.

The ROM 34 contains a basic input/output system ("BIOS") 40 and a BIOS pointer 42. The BIOS 40 comprises code that is executed by the CPU 22. At least a part of the functionality of the BIOS 40 is to help boot-up the computer 10. The BIOS code 40 contains test routines that execute during boot-up to test various of the computer system's components and sub-systems. The BIOS 40 also functions to provide a software interface on behalf of higher level applications to various hardware devices (e.g., non-volatile storage 30 and display 14) in the computer system. The BIOS pointer ("PTR") 42 comprises a value that identifies a starting location to begin execution during the boot-up process.

The O/S 50 is representative of operating systems usable on numerous types of computers. The user data 54 may include user-specific data such as contacts, calendar information (e.g., appointments) and tasks. The viewer 52 generally functions to present the user data 54 on display 14 and permit the user to manage (e.g., edit, delete, add) the user data. In at least one embodiment, the viewer application 52 is the Outlook® application by Microsoft Corp. and the user data 54 represents Outlook-compatible files. The user data 54 may comprise three files, one file for each of the user's contacts, calendar information, and tasks. The viewer 52 is an application that is compatible with and runs under the O/S 50.

The data capture application 56 comprises an "add-in" program that runs in conjunction with the viewer 52. The data capture application 56 functions to capture changes to the user data 54 so that a copy of some or all of the user data 54 can be stored in the quick look partition file 60 and in a format that may differ from the format of the user data file(s) 54. The data capture application 56 may capture changes to the user data 54 while the changes are being made. When a user, for example, adds a contact or task, not only is the new contact or task added to the user data file(s) 54, but concurrently or serially with that act, the data capture application 56 converts the new contact or task as noted above and stores a converted copy of the new data item in the quick look partition file 60. As such, the quick look partition file 60 may be updated as soon as changes are made to the user data 54. In other embodiments, updates to the quick look partition file 60 to reflect changes to the user data 54 may be made at other times such as while shutting down computer system 10 or at pre-programmed instances. For instance, the quick look partition file 60 may be updated every m minutes in which m is a predetermined or programmable time interval (e.g., every 5 minutes or hour).

Figure 3:
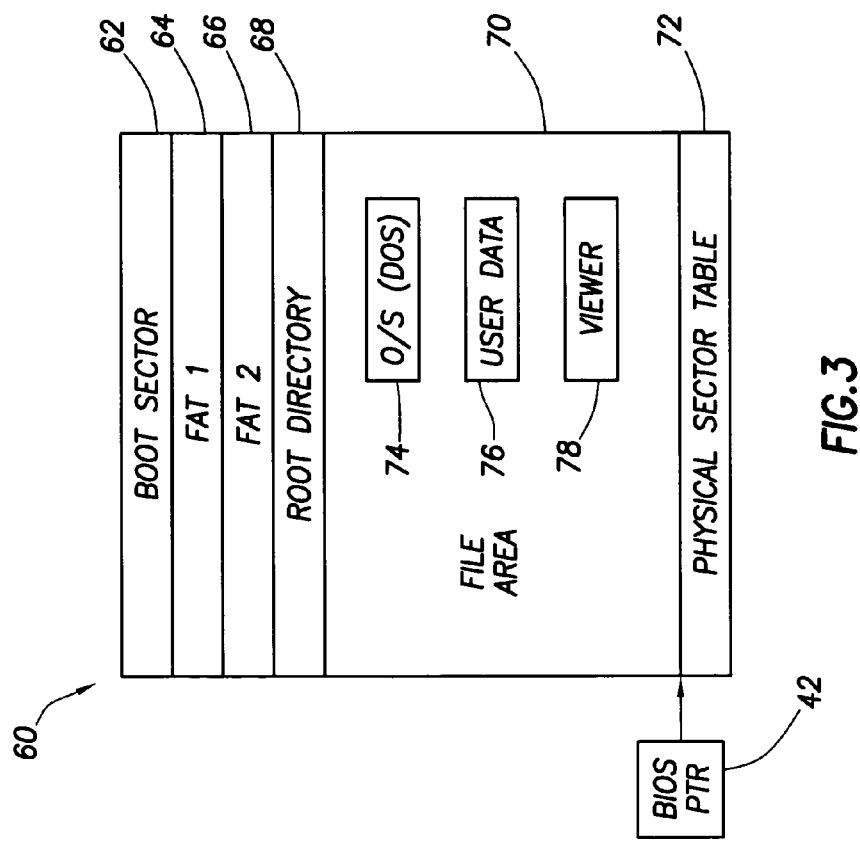
FIG. 3 shows an exemplary representation of a partition file used in accordance with embodiments of the invention.

An exemplary embodiment of the quick look partition file 60 is shown in FIG. 3. The embodiment of the quick look partition file 60 in FIG. 3 is a file allocation table 16 ("FAT16") format, although other formats can be used as well. The quick look partition file 60 comprises a boot sector 62, a FAT1 64, a FAT2 66, a root directory 68, a file area 70, and a physical sector table 72. The boot sector 62 generally comprises executable instructions that dictate how the CPU 22 is to boot up the computer.

The non-volatile storage 30 comprises a plurality of addressable clusters in which files may be stored. In system 10, a file may be stored in the non-volatile storage that spans more than one cluster. Further, clusters that comprise portions of a file may not be located consecutively. The FAT1 64 comprises references that are used to identify all of the clusters that provide portions of a single file. Thus, each cluster of a file has a reference in the FAT1 that identifies the next cluster that contains a portion of the file. By using the FAT1, the system can re-assemble a file from the various clusters containing portions of the file. The FAT2 66 is generally a copy of the FAT1 and may be included in the quick look partition file 60 for redundancy.

The root directory 68 contains information about the root directory of the non-volatile storage 30. Such information may include names of files and sub-directories.

The file area 70 contains an O/S 74, storage space 76 for user data, and a viewer application 78. Other information may be contained in the file area 70 as desired. The system 10 thus has at least two operating systems—a first O/S (i.e., O/S 50) stored on the non-volatile storage 30 outside the quick look partition file 60 and a second operating system (i.e., O/S 74) stored as part of the partition file 60. The O/S 74 in the quick look partition file's file area 70 may be the same or different type than the O/S 50 contained on the non-volatile storage 30 outside the quick look partition file 60. In some embodiments, the partition file's O/S 74 comprises an O/S that permits the computer system 10 to boot up faster than is the case with O/S 50. By way of example, O/S 50 may comprise a 32-bit or 64 bit O/S such as Windows XP by Microsoft Corp., while O/S 74 comprises a suitable version of the Disk Operating System ("DOS"). All else being equal, DOS, being smaller and having fewer features, generally boots faster than Windows XP. By including the faster booting O/S 74, the system 10 is able to boot up and provide access to the user data faster than if a "normal" boot process is performed (i.e., booting with the O/S 50). Booting the system 10 under O/S 74 is referred to herein as an "expedited" boot process because it is generally faster than the boot process using O/S 50. Although the term "expedited" is used with reference to the O/S 74-related boot process, the term expedited is not intended to impart any particular restrictions as to how long the boot process may take.

Referring still to FIG. 3, the physical sector table 72 contains physical sector addresses. The physical sector addresses from the physical sector table 72 are used to convert logical sector numbers from the FAT1 64 (or FAT2 66) to a physical sector address.

Figure 5:
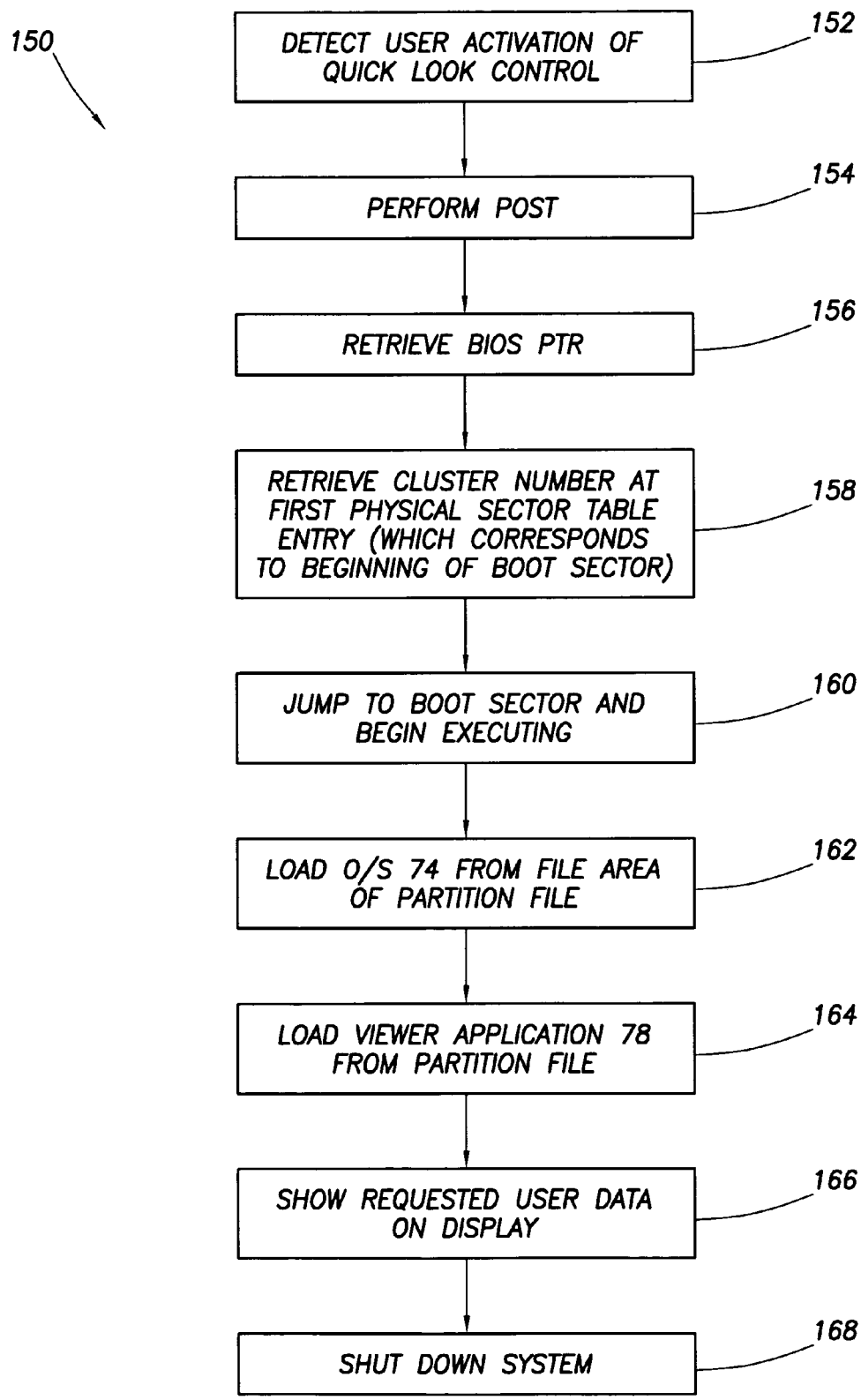
FIG. 5 shows an exemplary method of booting up the computer system of FIG. 1 to access the user data in the partition file.

During run-time of computer system 10 under O/S 50, the user creates, edits, views or otherwise manages the user data 54 via execution of the viewer application 52 which runs under O/S 50. FIG. 4 shows an exemplary method in which user data is captured during run-time to be stored in partition file 60 to be used later after the expedited boot process. FIG. 5 shows a method of performing the expedited boot up process for the computer system 10 by which the user is able to relatively quickly bring the computer system 10 up to a state at which the user data from the partition file 60 is accessible.

Referring now to FIG. 4, method 100 comprises blocks 102, 104, and 106. In block 102, the system captures the user data 54. This act may comprise the data capture application 56, running under O/S 50, causing updates to the user data 54 (outside the partition file 60) to be made to a mirror copy of the user data 76 (in the partition file) so that the user data 76 is the same or substantially the same as the user data 54. The data capture application may run in a background mode capturing user data while the viewer 52 is executing managing the user data. Alternatively, the data capture application may periodically update the partition file's user data 76 or update the user data 76 at prescribed events such as closing the viewer application 52 or shutting down the computer system 10.

In block 104, method 100 comprises converting the captured user data into a format that is compatible with the quick look partition file 60. In some embodiments, this act may comprise converting a larger file that is usable by the viewer 52 running under the O/S 50 and that contains Extensible Markup Language ("XML") data in which labels and data fields comprise text into a smaller file that may contain comma-separated data fields without label names for any fields. In block 106, the converted user data is stored in the quick look partition file's user data 76. Blocks 104 and 106 may be performed by the data capture application 56.

FIG. 5 shows an embodiment of a method 150 by which the computer system 10 can perform an expedited boot process to provide a user access to the user data stored in the quick look partition file 60. While the system is off, a user may activate the quick look control 16 to initiate the expedited boot process. Accordingly, in block 152, the system detects user activation of the quick look control. In block 154, the system's BIOS 40 may perform a power on self-test ("POST"). In at least one embodiment, the POST performed during the expedited boot process may be less involved than the POST that would be performed during a non-expedited boot process. In at least one embodiment, the expedited boot process does not include extensive power in testing of devices or hardware chip set initialization of hardware that is unused during use of the O/S 74. In block 156, the BIOS 40 retrieves the BIOS PTR 42 from the ROM 34. As shown in FIG. 3, the BIOS PTR 42 points to the first entry in the physical sector table 72 of the quick look partition file 60. Using the BIOS PTR 42 as an index into the physical sector table, the method comprises reading the contents of the non-volatile storage 30 corresponding to the physical sector number to which the BIOS PTR 42 points (block 158). In accordance with various embodiments of the invention, the physical sector number to which the BIOS PTR 42 points is the first sector number of the boot sector 62 of the quick look partition file 60. In this manner, the CPU 22 begins executing the code contained in the boot sector 62 (block 160).

Referring still to FIG. 5, at least one of the actions that is performed as a result of executing the boot sector 62 is to load the O/S 74 from the file area 70 of the quick look partition file 60 as indicated by block 162. Additionally, the CPU 22 loads the viewer application 78 in block 164.

At this point in the expedited boot process, the system 10 has been brought to an operational state, the O/S 74 and viewer application 78 are loaded and running. The viewer application 78 permits the user to view and otherwise manage the user data 76 contained in the file area 70 of the quick look partition file 60. The user data may automatically be displayed on the display 14 or the user may user may interact with the keyboard 15 or touchpad 17 to select which of one or more types of user data (e.g., contacts, calendar information, tasks) is to be displayed (block 166). Finally, the system may shut down (block 168) upon expiration of predetermined amount of time in which no activity has occurred (e.g., the user has not activated any input controls on the system) or when the user selects a shut down feature that may be included as part of the viewer application. In at least some embodiments, while running under O/S 74, applications that run under O/S 50 are not permitted to run under O/S 74.

The user data 76 in the file area 70 of the quick look partition file may be stored in multiple sectors in the file area. The sectors may or may not be contiguous. The FAT1 64 or FAT2 66 comprise logical sector numbers that correspond to the sectors at which the requested user data is maintained while the physical sector table 72 contains physical sector numbers associated with the user data. The logical sector numbers may comprise 16-bit values while the physical sector numbers may comprise 32-bit (or other) values. The 16-bit logical sector number is compatible with the O/S 74, but is generally inadequate to access the non-volatile storage 30. As such, the logical sector numbers, which are used by the O/S 74, are converted to physical sector numbers using the physical sector table 72.

By way of example, if the user desires to view his or her contacts, the user interacts with the viewer application 78 to request contacts to be displayed. The viewer application 78, via the O/S 74, obtains the logical sector number of the first logical sector containing a first portion of the contact data. The first logical sector number is used as an index into the physical sector table 72 to obtain the physical sector number corresponding to the first logical sector number. Using that physical sector number, the CPU 22 retrieves the requested first portion of user's contacts. The FAT1 (or FAT2) is then accessed using the first logical sector number to obtain the second logical sector number (i.e., the sector number containing the second portion of the user's contacts). The second logical sector number is used as an index into the physical sector table 72 to obtain the corresponding second physical sector number at which the second portion of the requested contacts is stored. This process is repeated until all of the desired contacts are retrieved.

What is claimed is:

1. A system, comprising:
    non-volatile storage containing user data, an executable capture application, a first operating system contained within a non-volatile storage partition, and a partition file that contains a second operating system, said partition file is contained within the non-volatile storage partition;
    a read only memory (ROM) that contains an executable BIOS; and
    a CPU communicatively coupled to the non-volatile storage and the ROM;
    an input control that, when activated by a user while the system is an off state, causes the CPU to load and execute the second operating system, instead of the first operating system, to provide the user access to user data in the partition file;
    wherein the capture application executes under the first operating system within the non-volatile storage partition and causes the CPU to store said user data in said partition file.

2. The system of claim 1 wherein the first operating system differs in type from the second operating system.

3. The system of claim 1 wherein the partition file is adapted to be accessed during a boot up process to permit a user to access the user data contained in the partition file, and wherein the CPU boots up the system to access the partition file's user data by loading and executing the second operating system instead of the first operating system.

4. A method usable in a system, comprising:
    capturing user data accessible under a first operating system included in a non-volatile storage partition;
    converting the captured user data to a format compatible with a partition file included within the non-volatile storage partition and accessible by a second operating system included within the partition file; and
    storing the converted user data in the partition file.

5. The method of claim 4 wherein capturing the user data comprises running an application in a background mode collecting user data while a viewer application enables a user to manage the user data.

6. The method of claim 4 wherein capturing the user data comprises periodically updating the partition file with the user data.

7. The method of claim 4 wherein capturing the user data comprises updating the partition file with the user data upon occurrence of prescribed events.

8. The method of claim 4 wherein converting the captured user data comprises generating logical sector numbers that correspond to physical sector numbers associated with partition file.

* * * * *

UNITED STATES PATENT AND TRADEMARK OFFICE
CERTIFICATE OF CORRECTION

PATENT NO. : 7,430,661 B2
APPLICATION NO. : 10/937145
DATED : September 30, 2008
INVENTOR(S) : Loren S. Dunn et al.

It is certified that error appears in the above-identified patent and that said Letters Patent is hereby corrected as shown below:

In column 2, line 57, after "34 and" delete "1/0" and insert -- I/O --, therefor.

In column 2, line 57, after "The" delete "1/0" and insert -- I/O --, therefor.

Signed and Sealed this

Twentieth Day of January, 2009

JON W. DUDAS
*Director of the United States Patent and Trademark Office*